(12) United States Patent
Liu et al.

(10) Patent No.: US 10,045,038 B2
(45) Date of Patent: Aug. 7, 2018

(54) METHOD AND APPARATUS FOR USING A CURRENT PICTURE AS A REFERENCE PICTURE

(71) Applicant: HFI Innovation Inc., Zhubei, Hsinchu County (TW)

(72) Inventors: Shan Liu, San Jose, CA (US); Xiaozhong Xu, State College, PA (US); Chenghao Liu, San Jose, CA (US)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 0 days.

(21) Appl. No.: 15/574,253

(22) PCT Filed: May 26, 2016

(86) PCT No.: PCT/CN2016/083449
§ 371 (c)(1),
(2) Date: Nov. 15, 2017

(87) PCT Pub. No.: WO2016/188447
PCT Pub. Date: Dec. 1, 2016

(65) Prior Publication Data
US 2018/0139461 A1 May 17, 2018

Related U.S. Application Data

(60) Provisional application No. 62/183,799, filed on Jun. 24, 2015, provisional application No. 62/167,474, filed on May 28, 2015.

(51) Int. Cl.
*H04N 7/12* (2006.01)
*H04N 19/433* (2014.01)
(Continued)

(52) U.S. Cl.
CPC ......... *H04N 19/433* (2014.11); *H04N 19/105* (2014.11); *H04N 19/159* (2014.11);
(Continued)

(58) Field of Classification Search
CPC combination set(s) only.
See application file for complete search history.

(56) References Cited

U.S. PATENT DOCUMENTS

2012/0106624 A1* 5/2012 Huang ................. H04N 19/117
375/240.02
2013/0077697 A1 3/2013 Chen et al.
(Continued)

FOREIGN PATENT DOCUMENTS

WO WO 2015/031806 A1 3/2015

OTHER PUBLICATIONS

International Search Report dated Aug. 25, 2016, issued in application No. PCT/CN2016/083449.

*Primary Examiner* — Tracy Y Li
(74) *Attorney, Agent, or Firm* — McClure, Qualey & Rodack, LLP

(57) ABSTRACT

Methods and apparatus of managing decoded picture buffer for a video coding system are disclosed for a system using an Inter prediction mode and an Intra Block Copy mode. According to one method, a current-picture-usage flag in a picture or slice level is determined. If the current-picture-usage flag indicates that the current picture is not allowed to be used as the reference picture for the current picture, only one picture buffer is allocated in a DPB (decoded picture buffer) for the current picture and a reconstructed current picture after in-loop filtering is stored in the picture buffer in the DPB. According to another method, the system allocates only one picture buffer in the DPB for both the Inter prediction mode and the Intra Block Copy mode of the
(Continued)

current picture if all of one or more in-loop filters are disabled for the entire part of the current picture.

11 Claims, 2 Drawing Sheets

(51) Int. Cl.
*H04N 19/51* (2014.01)
*H04N 19/172* (2014.01)
*H04N 19/159* (2014.01)
*H04N 19/105* (2014.01)
*H04B 1/66* (2006.01)
*H04N 19/70* (2014.01)

(52) U.S. Cl.
CPC ........... H04N 19/172 (2014.11); H04N 19/51 (2014.11); *H04B 1/66* (2013.01); *H04N 19/70* (2014.11)

(56) References Cited

U.S. PATENT DOCUMENTS

| | | | |
|---|---|---|---|
| 2013/0208792 A1* | 8/2013 | He | H04N 19/00569 375/240.12 |
| 2014/0037017 A1 | 2/2014 | Lin et al. | |
| 2014/0169459 A1 | 6/2014 | Zhang et al. | |
| 2014/0192885 A1* | 7/2014 | Seregin | H04N 19/597 375/240.16 |
| 2014/0362917 A1* | 12/2014 | Joshi | H04N 19/46 375/240.13 |
| 2015/0103884 A1 | 4/2015 | Ramasubramonian et al. | |
| 2015/0271517 A1* | 9/2015 | Pang | H04N 19/105 375/240.02 |
| 2016/0080753 A1* | 3/2016 | Oh | H04N 19/70 375/240.14 |
| 2016/0227244 A1* | 8/2016 | Rosewarne | H04N 19/105 |
| 2017/0142418 A1* | 5/2017 | Li | H04N 19/159 |

* cited by examiner

METHOD AND APPARATUS FOR USING A CURRENT PICTURE AS A REFERENCE PICTURE

CROSS REFERENCE TO RELATED APPLICATIONS

The present invention claims priority to U.S. Provisional Patent Application, Ser. No. 62/167,474, filed on May 28, 2015 and U.S. Provisional Patent Application, Ser. No. 62/183,799, filed on Jun. 24, 2015. The U.S. Provisional Patent Applications are hereby incorporated by reference in their entireties.

FIELD OF THE INVENTION

The present invention relates to video coding that allows using a current picture as a reference picture. In particular, the present invention relates to techniques of signalling the use of current picture as a reference picture and determining the number of versions of reconstructed pictures to be stored.

BACKGROUND AND RELATED ART

High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition.

In the current development of screen content coding for High Efficiency Video Coding (HEVC) standard, some tools have been adopted due to their improvements in coding efficiency for screen contents. For Intra blocks, Intra prediction according to the conventional approach is performed using prediction based on reconstructed pixels from neighbouring blocks. Intra prediction may select an Intra Mode from a set of Intra Modes, which include a vertical mode, horizontal mode and various angular prediction modes. For HEVC screen content coding, a new coding mode, named Intra-block copy (IntraBC) has been used.

Intra-block copy (IntraBC) uses reconstructed samples in the current picture before in-loop filter as a reference picture for prediction. This un-filtered picture needs to be stored in addition to the filtered picture after in-loop filter. To store the reconstructed samples before in-loop filter, additional memory and the memory bandwidth may be required for reading and writing, respectively. In the case that all reconstructed samples before in-loop filter may be used as the reference for IntraBC prediction, the whole reconstructed picture before in-loop filter needs to be stored. Hence, both the reconstructed current pictures before in-loop filter and after in-loop filter may need to be stored for IntraBC prediction and for temporal prediction respectively. Therefore, Intra block copy memory access causes increased memory bandwidth. In addition, it also causes additional decoding picture buffer (DPB).

In order to store the additional reconstructed samples before in-loop filter, Section 8: general decoding process of High Efficiency Video Coding (HEVC) Screen Content Coding (SCC): Draft 3 (Joshi, et al., *HEVC Screen Content Coding Draft Text* 3, Joint Collaborative Team on Video Coding (JCT-VC) of ITU-T SG 16 WP 3 and ISO/IEC JTC 1/SC 29/WG 11, 20th Meeting: Geneva, CH, 10-18 Feb. 2015, Document: JCTVC-T1005) is modified so that a picture storage buffer in the decoded picture buffer (DPB) is allocated for the current picture. In HEVC SCC: Draft 3, the reconstructed current picture is marked as "used for long-term reference" in case that curr_pic_as_ref_enabled_flag is equal to 1. When curr_pic_as_ref_enabled_flag is equal to 1, the decoded sample values of the reconstructed current picture before in-loop filtering are stored into the picture storage buffer allocated for the current picture. After completing the decoding of all slices, the entire current decoded picture after in-loop filter is stored in the picture storage buffer allocated for the current picture and is marked as "used for short-term reference".

In the High Efficiency Video Coding (HEVC) Screen Content Coding (SCC): Draft 3 (Joshi, et al., HEVC Screen Content Coding Draft Text 3, Joint Collaborative Team on Video Coding (JCT-VC) of ITU-T SG 16 WP 3 and ISO/IEC JTC 1/SC 29/WG 11, 20th Meeting: Geneva, CH, 10-18 Feb. 2015, Document: JCTVC-T1005), a picture may be included in a reference picture list of the picture and used as a reference picture in the IntraBC prediction mode. To indicate whether or not a picture may be included in a reference picture list of the picture itself, a flag named curr_pic_as_ref_enabled_flag is signalled in the SPS (sequence parameter set) extension (i.e., sps_scc_extension) as a part of SPS.

By including current picture in a reference picture, the Intra-block copy (IntraBC) mode is signalled reusing Inter mode signalling as disclosed in JCTVC-S0302 (Pang, et al., *Non-CE2: Intra block copy and Inter signaling unification*, Joint Collaborative Team on Video Coding (JCT-VC) of ITU-T SG 16 WP 3 and ISO/IEC JTC 1/SC 29/WG 11, 19th Meeting: Strasbourg, FR, 17-24 Oct. 2014, Document: JCTVC-S0302). To differentiate whether it is a conventional Inter mode (as in HEVC version 1 and AVC) or IntraBC mode, a reference index can be checked to determine if it is equal to the current picture. If the reference index is the current picture, it means that the current prediction is the IntraBC mode.

Specifically, the sequence parameter set (SPS) extension of the HEVC SCC: Draft 3 specifies the following semantics for curr_pic_as_ref_enabled_flag as follows:

curr_pic_as_ref_enabled_flag equal to 1 specifies a picture referring to the SPS may be included in a reference picture list of the picture itself. curr_pic_as_ref_enabled_flag equal to 0 specifies that a picture referring to the SPS is never included in any reference picture list of the picture itself. When not present, the value of curr_pic_as_ref_enabled_flag is inferred to be equal to 0.

In the decoding process for reference picture lists construction as specified in the HEVC SCC: Draft 3, the curr_pic_as_ref_enabled_flag present in the SPS extension of screen content coding is used as a flag to indicate whether the current picture used for IntraBC prediction is inserted in the reference picture list 0.

According to the HEVC SCC: Draft 3 specification, the curr_pic_as_ref_enabled_flag present in the SPS extension of screen content coding can be used to an entire coded video sequence (CVS). Whether to apply the flag is based on the whole sequence instead of individual pictures. Hence, it is not possible to indicate whether the current picture is included in a reference picture list of the picture for individual pictures within a sequence when curr_pic_as_ref_enabled_flag equal to 1 as specified in HEVC SCC: Draft 3.

In JCTVC-S0145 (Rapaka, et al., *Bandwidth reduction method for intra block copy*, Joint Collaborative Team on Video Coding (JCT-VC) of ITU-T SG 16 WP 3 and ISO/IEC JTC 1/SC 29/WG 11, 19th Meeting: Strasbourg, FR, 17-24 Oct. 2014, Document: JCTVC-S0145), a method is disclosed to reduce average bandwidth when Intra-block copy (IntraBC) mode is used for prediction. The method is based on the observation that not all previously unfiltered decoded samples of the current picture are used for prediction in IntraBC mode. JCTVC-S0145 discloses a method to indicate which of the previously decoded coding tree blocks (CTBs) are used for IntraBC prediction. Accordingly, only the IntraBC coded CTBs in the current picture need to be stored. Therefore, the average bandwidth can be reduced.

However, it is required to know how many CTBs in a slice and to send the flags in advance. Furthermore, curr_pic_as_ref_enabled_flag present in the SPS extension of screen content coding is used to indicate whether the current picture is inserted in a reference picture list and used for reference picture. To address these issues, a method to signal a CTU level flag to indicate whether CTB is used for IntraBC prediction is disclosed in JCTVC-T0051 (Laroche, et al., *AHG10: On IntraBC memory reduction*, Joint Collaborative Team on Video Coding (JCT-VC) of ITU-T SG 16 WP 3 and ISO/IEC JTC 1/SC 29/WG 11, 20th Meeting: Geneva, CH, 10-18 Feb. 2015, Document: JCTVC-T0051) and JCTVC-T0045 (Lainema, et al., *AHG10: Memory bandwidth reduction for intra block copy*, Joint Collaborative Team on Video Coding (JCT-VC) of ITU-T SG 16 WP 3 and ISO/IEC JTC 1/SC 29/WG 11, 20th Meeting: Geneva, CH, 10-18 Feb. 2015, Document: JCTVC-T0045). Therefore, either CTBs before in-loop filter or after in-loop filter are stored to avoid additional storage when curr_pic_as_ref_enabled_flag is equal to one.

Problems with Existing Methods

According to HEVC SCC: Draft 3, curr_pic_as_ref_enabled_flag is signalled in the SPS extension of screen content coding. In a scenario of scene changes, such as scene changes between screen content and natural video content, the encoder may want to change the flag of using current picture as reference picture upon detection of the scene changes between natural sequence and screen content sequence. For screen content pictures, IntraBC may be more effective. However, the sequence based flag according to HEVC SCC: Draft 3 won't allow changing the flag of using current picture at picture level. It is desirable to indicate whether to insert the current picture in a reference picture list (i.e., using IntraBC mode) in a lower level, such as the picture level.

In High Level Syntax, the current picture is placed after all short term reference pictures and all other long term reference pictures during the initialization of reference picture list construction. The related descriptions are listed below for List 0. Similar process can be applied for List 1.

At the beginning of the decoding process for each slice, the reference picture list RefPicList0 for P slices and, both reference picture lists RefPicList0 and RefPicList1 for B slices are derived as follows:

TABLE 1

At the beginning of the decoding process for each slice, the reference picture lists RefPicList0 and RefPicList1 (used for B slices) are derived as follows:
NumRpsCurrTempList0 is set to Max( num_ref_idx_l0_active_minus1 + 1, NumPicTotalCurr ) and the list RefPicListTemp0 is constructed as follows:
rIdx = 0
while( rIdx < NumRpsCurrTempList0 ) {
  for( i = 0; i < NumPocStCurrBefore && rIdx < NumRpsCurrTempList0; rIdx++, i++ )
    RefPicListTemp0[ rIdx ] = RefPicSetStCurrBefore[ i ]
  for( i = 0; i < NumPocStCurrAfter && rIdx < NumRpsCurrTempList0; rIdx++, i++ )
    RefPicListTemp0[ rIdx ] = RefPicSetStCurrAfter[ i ]
  for( i = 0; i < NumPocLtCurr && rIdx < NumRpsCurrTempList0; rIdx++, i++ )
    RefPicListTemp0[ rIdx ] = RefPicSetLtCurr[ i ]
  if( curr_pic_as_ref_enabled_flag )
    RefPicListTemp0[ rIdx++ ] = currPic
}

In Table 1, curr_pic_as_ref_enabled_flag equal to 1 specifies a picture referring to the SPS (sequence parameter set) may be included in a reference picture list of the picture itself curr_pic_as_ref_enabled_flag equal to 0 specifies that a picture referring to the SPS is never included in any reference picture list of the picture itself. When not present, the value of curr_pic_as_ref_enabled_flag is inferred to be equal to 0.

After the initialization, the reference picture list RefPicList0 is constructed as shown in the following table:

TABLE 2 for( rIdx = 0; rIdx <= num_ref_idx_l0_active_minus1; rIdx++)
  RefPicList0[ rIdx ] = ref_pic_list_modification_flag_l0 ?
RefPicListTemp0[ list_entry_l0[ rIdx ] ] : RefPicListTemp0[ rIdx ]

However, when the number of active reference pictures (i.e., num_ref_idx_l0_active_minus1+1) is smaller than the number of reference pictures in the list (NumRpsCurrTempList0) associated with the RefPicListTemp0 array storing the current picture, the current picture may not be included in the active reference picture list.

In a coding system based on the existing HEVC, there is an issue associated with Decoded Picture Buffer (DPB) management for IntraBC. When IntraBC is used, the reconstructed portion of current picture may be used as a reference picture to predict current picture. This reference picture for IntraBC is referred as "the unfiltered version of current picture". On the other hand, the version of current picture that will eventually go through filtering operations such as deblocking and SAO (Sample Adaptive Offset) is referred to the filtered version of current picture.

A reference picture has to be in Decoded Picture Buffer (DPB) in order to be used by a current picture. The size of DPB is constrained to be MaxDpbSize, which is derived as shown in Table 3.

TABLE 3

```
if( PicSizeInSamplesY <= ( MaxLumaPs >> 2 )
    MaxDpbSize = Min( 4 * maxDpbPicBuf, 16 )
else if( PicSizeInSamplesY <= ( MaxLumaPs >> 1 )
    MaxDpbSize = Min( 2 * maxDpbPicBuf, 16 )
else if( PicSizeInSamplesY <= ( ( 3 * MaxLumaPs ) >> 2 ) )
    MaxDpbSize = Min( ( 4 * maxDpbPicBuf ) / 3, 16 )
else
    MaxDpbSize = maxDpbPicBuf
```

In Table 3, MaxLumaPs is the maximum luma picture size and maxDpbPicBuf is the maximum DPB size, such as 6. However, there are some issues in the current DPB management operations when IntraBC is used.

BRIEF SUMMARY OF THE INVENTION

Methods and apparatus of managing decoded picture buffer for a video coding system are disclosed, where the video coding system uses coding modes including a conventional (or temporal) inter prediction mode (as in HEVC version 1 and AVC) and a new Inter prediction mode adopted by HEVC SCC, a.k.a. Intra Block Copy (IntraBC) mode. According to this method, a current-picture-usage flag in a picture level or slice level is determined. The current-picture-usage flag indicates whether a current picture is allowed to be used as a reference picture for predicting and coding itself. Equivalently, the current-picture-usage flag also (at the same time) indicates whether IntraBC mode is enabled (or, may be utilized) for coding a current picture. If the current-picture-usage flag indicates that the current picture is not allowed to be used as the reference picture for the current picture, only one picture buffer is allocated in a DPB (decoded picture buffer) for the current picture and a reconstructed current picture after or before in-loop filtering is stored in the picture buffer in the DPB, depending on whether the in-loop filters are enabled. If the current-picture-usage flag indicates that the current picture is allowed to be used as the reference picture for the current picture, up to two picture buffers for the current picture are allowed to be allocated in the DPB. If in-loop filters are enabled, both the reconstructed current picture after the in-loop filtering and the reconstructed current picture before the in-loop filtering are stored in the up to two picture buffers in the DPB. The current-picture-usage flag in the picture level or slice level can be used to replace a corresponding current-picture-usage flag in a sequence level. Alternatively, the current-picture-usage flag in the picture level or slice level can be used in addition to a corresponding current-picture-usage flag in a sequence level.

Another methods and Apparatus of managing decoded picture buffer are disclosed. The method determines whether in-loop filters, such as deblocking filter and SAO filter (sample adaptive offset filter), are used for an entire part of a current picture. If both the deblocking filter and the SAO filter are disabled for the entire part of the current picture, only one picture buffer in a DPB is allocated for both temporal inter prediction and the Intra Block Copy (IntraBC) prediction of the current picture and only an unfiltered version of reconstructed current picture is stored in the picture buffer. The method may further determines a current-picture-usage flag in a sequence level, picture level or slice level, where the current-picture-usage flag indicates whether a current picture is allowed to be used as a reference picture for the current picture. If the current-picture-usage flag indicates that the current picture is not allowed to be used as the reference picture for the current picture, only one picture buffer is allocated in the DPB for the temporal inter prediction mode of the current picture and only one version (filtered or unfiltered, depending on whether in-loop filters are enabled) of the reconstructed current picture is stored in the only one picture buffer. The SAO filter is disabled if any of following conditions is true: a) a sequence level SAO enable flag is false; b) the sequence level SAO enable flag is true, there is only one slice in the current picture, and a slice level SAO flag is false for all colour components; and c) the sequence level SAO enable flag is true, there are more than one slice in the current picture, and the slice level SAO flag is false for all colour components and for all slices. The deblocking filter is disabled if any of following conditions is true: a) there is only one slice in the current picture, and a slice-level deblocking-filter-disable flag is present and is true; b) there is only one slice in the current picture, the slice-level deblocking-filter-disable flag is not present, and a picture-level deblocking-filter-disable flag is true; and c) there are more than one slice in the current picture, the slice-level deblocking-filter-disable flag is true for all slices when present or when not present, the picture-level deblocking-filter-disable flag is true.

DETAILED DESCRIPTION OF THE INVENTION

Figure 1:
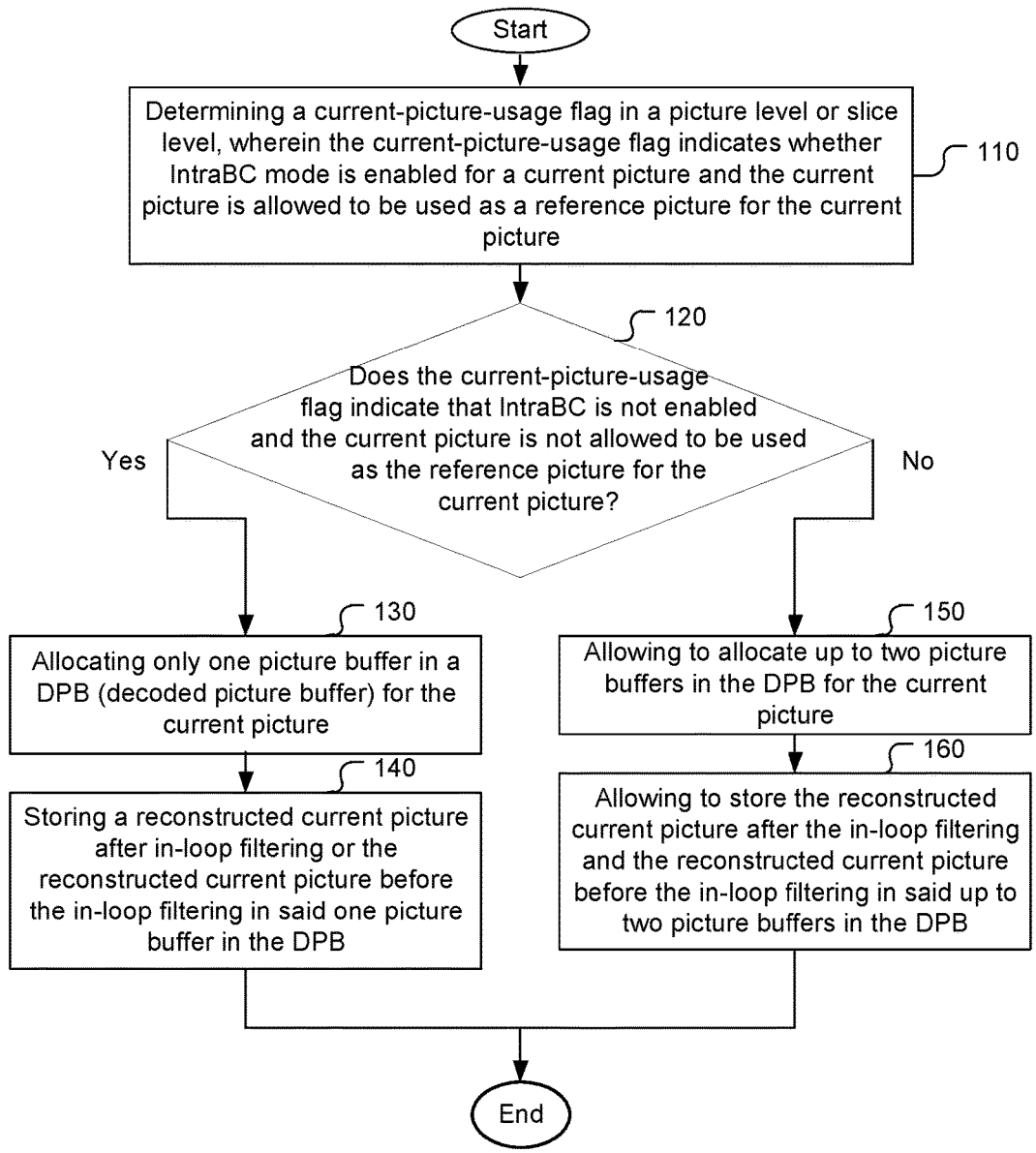
FIG. 1 illustrates a flowchart of an exemplary coding system using coding modes including conventional (or temporal) inter prediction mode (as in HEVC version 1 and AVC) and a new Inter prediction mode adopted by HEVC SCC, a.k.a. Intra Block Copy (IntraBC) mode according to an embodiment of the present invention, where a current-picture-usage flag in a picture level or slice level is used to indicate whether a current picture is allowed to be used as a reference picture for the current picture.

The following description is of the best-contemplated mode of carrying out the invention. This description is made for the purpose of illustrating the general principles of the invention and should not be taken in a limiting sense. The scope of the invention is best determined by reference to the appended claims.

As mentioned above, there are various issues associated with the signalling curr_pic_as_ref_enabled_flag in SPS level. First, in occurrence of a new scene, it is more effective to send a picture parameter set (PPS) to update the parameters than an SPS. Second, it wastes valuable bits to indicate the changed curr_pic_as_ref_enabled_flag in SPS level.

In video coding application with picture refreshing error resilient, indication of inserting current picture in a reference picture list can be used to provide refreshing functionality. In the progressive refresh based error control, the current picture is not included in a reference picture list in most access points, which are not targeted for refreshing. On the other hand, if the current picture is included in a reference picture list in the access points, the access points are targeted for refreshing to stop temporal error propagation and avoid wasting bits in Intra coding. The IntraBC mode will be more effective for a screen content picture than the Intra mode. For that it is required to provide a picture level of indication of inserting the current picture in a reference picture list of the picture itself.

Similarly, in video coding application with progressive slice refreshing error resilient, indication of inserting current picture in a reference picture list on slice level can be used to provide slice based refreshing functionality. In the progressive slice refresh based error control, current picture is not included in a reference picture list for most slices of one or multiple access points, which are not targeted for refreshing. On the other hand, if the current picture is included in a reference picture list for the slices of one or multiple access points, the slices are targeted for refreshing to stop temporal error propagation and avoid wasting bits in Intra coding. In this case, it is required to provide a slice-level indication of inserting the current picture in a reference picture list of the current picture.

If the flag of indicating inserting the current picture in a reference picture list of the current picture is present in PPS, then the flag present in the PPS can be used by an entire coded picture as determined by a syntax element found in each slice segment header as the definition of the PPS. Alternatively, if the flag indicating inserting the current picture in the reference list of the current picture is present in a slice segment header, then the flag present in slice segment header may be applied to a picture that includes the slice or applied to a slice segment. However, in the prior art, the flag of indicating inserting the current picture in a reference picture list of the current picture is only present in SPS, but not in PPS nor in slice segment header.

To cope with the limitations that curr_pic_as_ref_enabled_flag only presents in the SPS extension in HEVC SCC: Draft 3, the present invention discloses a method of indicating whether a current picture is included in a reference picture list in a lower level such as PPS or/and slice segment header.

In the first embodiment, syntax elements sps_scc_extension and pps_scc_extension are modified in a way that curr_pic_as_ref_enabled_flag is removed from sps_scc_extension and a syntax element named curr_pic_in_ref_list_flag is added in the PPS extension of screen content coding, which is a part of PPS as follows. In following, all modifications are based on the HEVC SCC: Draft 3. In the following tables and semantics, the text enclosed by an asterisk pair within a bracket pair (i.e., "[*deleted text*]") indicates deletion and text in Italic indicates insertion.

TABLE 4

| | Descriptor |
|---|---|
| sps_scc_extension( ) { | |
| [*curr_pic_as_ref_enabled_flag*] | [*u(1)*] |
| palette_mode_enabled_flag | u(1) |
| ... | |
| } | |

TABLE 5

| | Descriptor |
|---|---|
| pps_scc_extension( ) { | |
| residual_adaptive_colour_transform_enabled_flag | u(1) |
| ... | |
| curr_pic_in_ref_list_flag | u(1) |
| } | |

In the first embodiment, the semantics of curr_pic_in_ref_list_flag in pps_scc_extension is modified as compared to curr_pic_as_ref_enabled_flag previously present in sps_scc_extension as follows:

[*curr_pic_as_ref_enabled_flag*] curr_pic_in_ref_list_flag equal to 1 specifies IntraBC is enabled for a picture referring to this PPS[*SPS*]. The current picture is [*may be*] regarded as a reference picture and included in a reference picture list of slice(s) in the picture itself. When IntraBC is enabled, blocks in the current picture can be compensated in a similar way as motion compensation but using the reconstructed samples of the same picture. [*curr_pic_as_ref_enabled_flag*] curr_pic_in_ref_list_flag equal to 0 specifies that IntraBC is not enabled for a picture referring to this PPS[*SPS*]. The current picture is not included in any reference picture list of slice(s) in the picture itself. When not present, the value of [*curr_pic_as_ref_enabled_flag*] curr_pic_in_ref_list_flag is inferred to be equal to 0.

In the second embodiment, the syntax element slice_segment_header is modified in a way that a syntax element named curr_pic_in_ref_list_flag is added if the curr_pic_as_ref_enabled_flag present in the referred SPS is equal to 1 as follows. In the following table, text in Italic indicates insertion.

TABLE 6

| | Descriptor |
|---|---|
| slice_segment_header( ) { | |
| ... | u(1) |
| if( !dependent_slice_segment_flag ) { | |
| ... | |
| if(curr_pic_as_ref_enabled_flag ) | |
| curr_pic_in_ref_list_flag | u(1) |
| if( slice_type = = P \|\| slice_type = = B ) { | |
| ... | |
| } | |
| ... | |
| } | |
| ... | |
| byte_alignment( ) | |
| } | |

In one modification of the second embodiment, the semantics of curr_pic_in_ref_list_flag in slice_segment_header is modified as compared to curr_pic_as_ref_enabled_flag previously present in sps_scc_extension as follows.

[*curr_pic_as_ref_enabled_flag*] curr_pic_in_ref_list_flag equal to 1 specifies [*a*] IntraBC is enabled for the current picture. [*referring to the SPS may be*]. The current picture is regard as a reference picture and included in a reference picture list of slice(s) in the current picture itself. When IntraBC is enabled, blocks in the current picture can be compensated in a similar way of motion compensation but using the reconstructed samples of the same picture. curr_pic_in_ref_list_flag [*curr_pic_as_ref_enabled_flag*] equal to 0 specifies that [*a*] IntraBC is not enabled for the current picture—[*referring to the SPS*]. The current picture is not [*never*] included in any reference picture list of slice(s) in the current picture itself. When not present, the value of

[*curr_pic_as_ref_enabled_flag*] curr_pic_in_ref_list_flag is inferred to be equal to 0. The [*curr_pic_as_ref_enabled_flag*] curr_pic_in_ref_list_flag present in slice segment headers of a coded picture shall be an identical value either 0 or 1 for all the slice segment headers of a coded picture.

In another modification of the second embodiment, the semantics of curr_pic_in_ref_list_flag in slice_segment_header is modified as compared to curr_pic_as_ref_enabled_flag previously present in sps_scc_extension as follows.

[*curr_pic_as_ref_enabled_flag*] curr_pic_in_ref_list_flag equal to 1 specifies IntraBC is enabled for [*a*] the current picture [referring to the SPS may be]. The current picture is regarded as a reference picture and is included in a reference picture list of slice(s) in the current picture itself [*curr_pic_as_ref_enabled_flag*] When IntraBC is enabled, blocks in the current picture can be compensated in a similar way of motion compensation but using the reconstructed samples of the same picture. curr_pic_in_ref_list_flag equal to 0 specifies that [*a*] IntraBC is not enabled for the current picture [*referring to the SPS*]. The current picture is not [*never*] included in any reference picture list of slice(s) in the current picture itself. When not present, the value of [*curr_pic_as_ref_enabled_flag*] curr_pic_in_ref_list_flag is inferred to be equal to 0.

In one more modification of the second embodiment, the syntax of slice_segment_header is modified in a way that a syntax element named curr_pic_in_ref_list_flag is added if the curr_pic_as_ref_enabled_flag present in the referred PPS is equal to 1 as shown in Table 7. The syntax of sps_scc_extension and pps_scc_extension are modified in a way that curr_pic_as_ref_enabled_flag is removed from sps_scc_extension to pps_scc_extension as a part of PPS as shown in Table 8 and Table 9. As shown in Table 8, syntax element curr_pic_as_ref_enabled_flag is removed from the syntax table of SPS SCC extension. On the other hand, Table 9 illustrate syntax element curr_pic_as_ref_enabled_flag is added to the syntax table of PPS SCC extension.

TABLE 7

| | Descriptor |
|---|---|
| slice_segment_header( ) { | |
| ... | u(1) |
| if( !dependent_slice_segment_flag ) { | |
| ... | |
| if(curr_pic_as_ref_enabled_flag ) | |
| curr_pic_in_ref_list_flag | u(1) |
| if( slice_type = = P \|\| slice_type = = B) { | |
| ... | |
| } | |
| ... | |
| } | |
| ... | |
| byte_alignment( ) | |
| } | |

TABLE 8

| | Descriptor |
|---|---|
| sps_scc_extension( ) { | |
| [*curr_pic_as_ref_enabled_flag*] | u(1) |
| palette_mode_enabled_flag | u(1) |
| ... | |
| } | |

TABLE 9

| | Descriptor |
|---|---|
| pps_scc_extension( ) { | |
| residual_adaptive_colour_transform_enabled_flag | u(1) |
| ... | |
| curr_pic_as_ref_enabled_flag | u(1) |
| } | |

The example in Table 8 and Table 9 illustrates one embodiment of the method of indicating whether a current picture is included in a reference picture list for the all slice(s) in the current picture by moving the syntax element curr_pic_as_ref_enabled_flag from SPS SCC extension to PPS SCC extension. However, in another embodiment, the syntax element curr_pic_as_ref_enabled_flag can be added to PPS SCC extension in addition to the syntax element curr_pic_as_ref_enabled_flag in SPS SCC extension. An example to add the syntax element curr_pic_as_ref_enabled_flag to PPS SCC extension in addition to SPS SCC extension is shown in Table 10 and Table 11.

TABLE 10

| | Descriptor |
|---|---|
| sps_scc_extension( ) { | |
| curr_pic_as_ref_enabled_flag | u(1) |
| palette_mode_enabled_flag | u(1) |
| ... | |
| } | |

TABLE 11

| | Descriptor |
|---|---|
| pps_scc_extension( ) { | |
| residual_adaptive_colour_transform_enabled_flag | u(1) |
| ... | |
| curr_pic_as_ref_enabled_flag | u(1) |
| } | |

In the one more modification of the second embodiment, the semantics of curr_pic_in_ref_list_flag in slice_segment_header is modified as compared to curr_pic_as_ref_enabled_flag previously present in sps_scc_extension as follows:

[*curr_pic_as_ref_enabled_flag*] curr_pic_in_ref_list_flag equal to 1 specifies IntraBC is enabled for the current picture. [*a*] the current picture [*referring to the SPS may be*] is regarded as a reference picture and included in a reference picture list of this slice in the current picture itself. [*curr_pic_as_ref_enabled_flag*] When IntraBC is enabled, blocks in the current picture can be compensated in a similar way of motion compensation but using the reconstructed samples of the same picture. curr_pic_in_ref_list_flag equal to 0 specifies that IntraBC is enabled for the current picture.

[*a*] the current picture [*referring to the SPS*] is not [*never*] included in any reference picture list of this slice in the current picture itself. When not present, the value of [*curr_pic_as_ref_enabled_flag*] curr_pic_in_ref_list_flag is inferred to be equal to 0.

In the semantics of the curr_pic_in_ref_list_flag, the additional constraint may be applied in addition to the above semantic that the [*curr_pic_as_ref_enabled_flag*] curr_pic_in_ref_list_flag present in slice_segment headers of a coded picture shall be an identical value either 0 or 1 for all the slice_segment headers of a coded picture.

In the one more modification of the second embodiment, the semantics of curr_pic_as_ref_enabled_flag in pps_scc_extension is modified as compared to curr_pic_as_ref_enabled_flag previously present in sps_scc_extension as follows.

curr_pic_as_ref_enabled_flag equal to 1 specifies IntraBC is enabled for a picture referring to the PPS[*SPS*]. The current picture is regarded as a reference picture and may be included in a reference picture list of slice(s) in the picture itself. When IntraBC is enabled, blocks in the current picture can be compensated in a similar way of motion compensation but using the reconstructed samples of the same picture. curr_pic_as_ref_enabled_flag equal to 0 specifies that IntraBC is not enabled for a picture referring to the PPS[*SPS*]. The current picture is never included in any reference picture list of slice(s) in the picture itself. When not present, the value of curr_pic_as_ref_enabled_flag is inferred to be equal to 0.

In the embodiments 1 and 2, decoding process for reference picture lists construction is modified in a way that curr_pic_in_ref_list_flag present in PPS or/and slice segment header, respectively, is served as a flag of indicating whether or not IntraBC is enabled for current picture or slice, and whether or not the current picture is included in a reference picture list of slice(s) in the picture itself. When IntraBC is enabled, blocks in the current picture can be compensated in a similar way of motion compensation but using the reconstructed samples of the same picture. An example of decoding process for reference picture list construction as defined in JCTVC-T1005 can be modified to incorporate an embodiment of the present invention as shown in the following table. This process is invoked at the beginning of the decoding process for each P or B slice.

TABLE 12

```
rIdx = 0
while( rIdx < NumRpsCurrTempList0 ) {
    for( i = 0; i < NumPocStCurrBefore && rIdx < NumRpsCurrTempList0; rIdx++, i++ )
        RefPicListTemp0[ rIdx ] = RefPicSetStCurrBefore[ i ]
    for( i = 0; i < NumPocStCurrAfter && rIdx < NumRpsCurrTempList0; rIdx++, i++ )
        RefPicListTemp0[ rIdx ] = RefPicSetStCurrAfter[ i ]
    for( i = 0; i < NumPocLtCurr && rIdx < NumRpsCurrTempList0; rIdx++, i++ )
        RefPicListTemp0[ rIdx ] = RefPicSetLtCurr[ i ]
    if([*curr_pic_as_ref_enabled_flag*] curr_pic_in_ref_list_flag)
        RefPicListTemp0[ rIdx++ ] = currPic
}
```

It is a requirement of bitstream conformance that when nal_unit_type has a value in the range of BLA_W_LP to RSV_IRAP_VCL23, inclusive (i.e. the picture is an TRAP picture) and [*curr_pic_as_ref_enabled_flag*] curr_pic_in_ref_list_flag is equal to 1, RefPicList0 shall contain one or more entries that refer to the current picture only.

In the embodiments 1 and 2, reference picture list modification semantics is modified in a way that curr_pic_in_ref_list_flag present in PPS or slice segment header, respectively, is served as a flag of indicating whether or not NumPicTotalCurr is incremented by one to count the current picture as a reference picture as follows.

An example of reference picture list as defined in JCTVC-T1005 can be modified to incorporate an embodiment of the present invention as shown in the following table. The variable NumPicTotalCurr is derived as follows:

TABLE 13

```
NumPicTotalCurr = 0
for( i = 0; i < NumNegativePics[ CurrRpsIdx ]; i++ )
    if( UsedByCurrPicS0[ CurrRpsIdx ][ i ] )
        NumPicTotalCurr++
for( i = 0; i < NumPositivePics[ CurrRpsIdx ]; i++)
    if( UsedByCurrPicS1[ CurrRpsIdx ][ i ] )
        NumPicTotalCurr++
for( i = 0; i < num_long_term_sps + num_long_term_pics; i++ )
    if( UsedByCurrPicLt[ i ] )
        NumPicTotalCurr++
if([*curr_pic_as_ref_enabled_flag*] curr_pic_in_ref_list_flag)
    NumPicTotalCurr++
```

Reference Picture List (i.e., RefPicListTemp0 Array) Construction Initialization Process In one embodiment, the process is modified such that the current picture (before loop filtering) is used as reference, and is put in the N-th position of the reference picture list (i.e., index N−1 in the list). The list can be either list 0 or list 1. The following example is provided for list 0. N can be an integer number in the range of (1, num_ref_idx_l0_active_minus1+1), inclusively. For example, N can be equal to 1 (i.e., the second position in the list, after one temporal reference picture) or N can be equal to num_ref_idx_l0_active_minus1+1 (i.e., the last position of the list).

An exemplary process is shown in the following table, where currPic refers to the current picture before in-loop filtering.

TABLE 14

```
The variable NumRpsCurrTempList0 is set equal to
Max( num_ref_idx_l0_active_minus1 + 1, NumPicTotalCurr ) and the
list RefPicListTemp0 is constructed as follows:
    rIdx = 0
    while( rIdx < NumRpsCurrTempList0 ) {
        for( i = 0; i < NumPocStCurrBefore && rIdx < NumRpsCurrTempList0; rIdx++, i++ ) {
            RefPicListTemp0[ rIdx ] = RefPicSetStCurrBefore[ i ]
            if (rIdx == N−1 && curr_pic_as_ref_enabled_flag )
                RefPicListTemp0[ ++rIdx ] = currPic
        }
        for( i = 0; i < NumPocStCurrAfter && rIdx < NumRpsCurrTempList0; rIdx++, i++ ) {
            RefPicListTemp0[ rIdx ] = RefPicSetStCurrAfter[ i ]
            if (rIdx == N−1 && curr_pic_as_ref_enabled_flag )
                RefPicListTemp0[ ++rIdx ] = currPic
        }
        for( i = 0; i < NumPocLtCurr && rIdx < NumRpsCurrTempList0; rIdx++, i++ ) {
            RefPicListTemp0[ rIdx ] = RefPicSetLtCurr[ i ]
            if (rIdx == N−1 && curr_pic_as_ref_enabled_flag )
                RefPicListTemp0[ ++rIdx ] = currPic
        }
    }
......
```

In another embodiment, the unfiltered (Deblocking and SAO filters) version of current picture is used as a possible reference picture for current slice, and it is placed at the last position of reference picture list X (X=0 or 1), when one or both of the following condition is true:

The sequence/picture/slice level flag signals that current unfiltered picture is used as a reference picture, The reference list modification for this list is not used.

An exemplary process is shown in the following table, where currPic refers to the current picture before loop filtering.

TABLE 15

The variable NumRpsCurrTempList0 is set equal to Max( num_ref_idx_l0_active_minus1 + 1, NumPicTotalCurr ) and the list RefPicListTemp0 is constructed as follows:
```
    rIdx = 0
    while( rIdx < NumRpsCurrTempList0 ) {
      for( i = 0; i < NumPocStCurrBefore && rIdx <
NumRpsCurrTempList0; rIdx++, i++ ) {
        RefPicListTemp0[ rIdx ] = RefPicSetStCurrBefore[ i ]
      }
      for( i = 0; i < NumPocStCurrAfter && rIdx <
NumRpsCurrTempList0; rIdx++, i++ ) { (8-8)
        RefPicListTemp0[ rIdx ] = RefPicSetStCurrAfter[ i ]
      }
      for( i = 0; i < NumPocLtCurr && rIdx < NumRpsCurrTempList0;
rIdx++, i++ ) {
        RefPicListTemp0[ rIdx ] = RefPicSetLtCurr[ i ]
      }
      if( curr_pic_as_ref_enabled_flag )
        RefPicListTemp0[ rIdx++ ] = currPic (note: current
        unfiltered picture)
    }
```

The list RefPicList0 is constructed as follows:

```
for( rIdx = 0; rIdx <= num_ref_idx_l0_active_minus1; rIdx++)
   RefPicList0[ rIdx ] = ref_pic_list_modification_flag_l0 ?
RefPicListTemp0[ list_entry_l0[ rIdx ] ] :   RefPicListTemp0[ rIdx ]
if( curr_pic_as_ref_enabled_flag &&
!ref_pic_list_modification_flag_l0)
   RefPicList0[ num_ref_idx_l0_active_minus1 ] = currPic
```

DPB Management for the Unfiltered Version of Current Picture Used as a Reference Picture

First Embodiment

In the reference picture list construction initialization process disclosed above, when curr_pic_as_ref_enabled_flag is equal to 1, both filtered and unfiltered versions of current picture may be placed in the DPB before starting the decoding process of current picture. When curr_pic_as_ref_enabled_flag is equal to 0, the unfiltered version of current picture will not be put in the DPB. The following aspects are addressed:

The time to put the up to two pictures into DPB can be indicated by the instance that the process occurs instantaneously at the CPB removal time of access unit n (of current picture), CpbRemovalTime[n].

The current decoded picture (unfiltered) is stored in the DPB in an empty picture storage buffer, the DPB fullness is increased by one, and the current picture (unfiltered) is marked as "used for long-term reference".

The current decoded picture (filtered) is stored in the DPB in an empty picture storage buffer, the DPB fullness is increased by one, and the current picture (filtered) is marked as "used for short-term reference".

After decoding of current picture (filtered), when curr_pic_as_ref_enabled_flag is equal to 1, the unfiltered version of current picture (if present) will be removed from the DPB, while the filtered version of current picture will remain in the DPB. After the current picture is processed the filtered/unfiltered version of current picture is referred as the filtered/unfiltered version of past picture respectively. The next to be decoded picture is referred as the next current picture. The following aspects are addressed:

The time to remove the unfiltered version of past picture can be indicated by the instance of the removal of this picture from the DPB, which occurs any time after the decoding of current picture, but has to be before decoding of the next current picture (can be after parsing the slice header of the first slice of the next current picture). One example of the removal time is immediately after decoding of the current picture, at the CPB removal time of the last decoding unit of access unit n (containing the current picture).

When the unfiltered version of past picture is removed from DPB, the DPB fullness is decreased by one.

The filtered version of past picture remains in the DPB.

In a variation of the first embodiment, before decoding the current picture (but after parsing the slice header of the first slice of the current picture), the filtered version and unfiltered version of current picture are the same if it is known that the loop filters (deblocking and SAO) are disabled for the entire picture. The operations related to the unfiltered version of current picture such as putting it into DPB and incrementing DPB fullness by one, and removing it from DPB and decrementing DPB fullness by one is not necessary.

Second Embodiment

When curr_pic_as_ref_enabled_flag is equal to 1, the filtered version of current picture is put in the DPB in an empty picture storage buffer before starting the decoding process of current picture. While the unfiltered version of current picture may be put in an empty picture storage buffer that is not counted as part of DPB. When curr_pic_as_ref_enabled_flag is equal to 0, the unfiltered version of current picture will not be put in an empty picture storage buffer that is not counted as part of DPB. The following aspects are addressed:

The time to put the filtered version of current picture into DPB can be indicated by the instance that the process occurs instantaneously at the CPB removal time of access unit n (of current picture), CpbRemovalTime[n].

The time to put the unfiltered version of current picture into an empty picture storage buffer (not stored in the DPB) can be indicated by: this process happens instantaneously at the CPB removal time of access unit n (of current picture), CpbRemovalTime[n]. The DPB fullness remains unchanged, and the current picture (unfiltered) is marked as "used for long-term reference".

The current decoded picture (filtered) is stored in the DPB in an empty picture storage buffer, the DPB fullness is increased by one, and the current picture (filtered) is marked as "used for short-term reference".

After decoding of current picture (filtered), when curr_pic_as_ref_enabled_flag is equal to 1, the unfiltered version of current picture (if present) will be removed from the picture storage buffer (not in DPB), while the filtered version of current picture will remain in the DPB. When the process moves to the next picture, the unfiltered version of current picture is referred as the unfiltered version of past picture. Similarly, the filtered version of current picture is referred as the filtered version of past picture. The next to be decoded picture is referred as the next current picture. The following aspects are addressed:

The time to remove the unfiltered version of past picture can be indicated by the instance of the removal of this picture from the picture storage buffer (not in DPB), which occurs any time after the decoding of current picture, but has to be before decoding of the next current picture (can be after parsing the slice header of the first slice of the next current picture). One example of the removal time is immediately after decoding of the current picture, at the CPB removal time of the last decoding unit of access unit n (containing the current picture)

When the unfiltered version of past picture is removed from the picture storage buffer (not in DPB), the DPB fullness remains unchanged Third Embodiment When curr_pic_as_ref_enabled_flag is equal to 1, the unfiltered version of the current picture may be placed in an empty picture storage buffer in the DPB, before starting the decoding process of current picture. While the filtered version of current picture is placed in an empty picture storage buffer that is not counted as part of DPB. When curr_pic_as_ref_enabled_flag is equal to 0, the unfiltered version of the current picture will not be placed in an empty picture storage buffer in the DPB. The following aspects are addressed:

The time to put the unfiltered version of current picture into DPB can be indicated by the instance that the process occurs instantaneously at the CPB removal time of access unit n (of current picture), CpbRemovalTime[n].

The current decoded picture (unfiltered) is stored in the DPB in an empty picture storage buffer, the DPB fullness is increased by one, and the current picture (unfiltered) is marked as "used for long-term reference".

The current decoded picture (filtered) is in an empty picture storage buffer (not stored in the DPB), the DPB fullness remains unchanged, and the current picture (filtered) is marked as "used for short-term reference".

After decoding of current picture (both filtered an unfiltered), when curr_pic_as_ref_enabled_flag is equal to 1, the unfiltered version of current picture (if present) will be removed from the DPB. While the filtered version of current picture will be put in the DPB. After the current picture is processed, the filtered/unfiltered version of current picture is referred as the filtered/unfiltered version of past picture respectively. The next to be decoded picture is referred as the next current picture. The following aspects are addressed in two approaches:

Approach A:

The time to remove the unfiltered version of past picture can be indicated by the instance of the removal of this picture from DPB, which occurs any time after the decoding of current picture, but has to be before decoding of the next current picture (can be after parsing the slice header of the first slice of the next current picture). One example of the removal time is immediately after decoding of the current picture, at the CPB removal time of the last decoding unit of access unit n (containing the current picture).

When the unfiltered version of past picture is removed from DPB, the DPB fullness is decremented by one.

Right after the unfiltered version of past picture is removed from DPB, the filtered version of past picture is put into DPB, the DPB fullness is incremented by one.

Approach B:

The filtered version of current picture is put into DPB, in the position of the unfiltered version of current picture, to replace it.

The time to move the unfiltered version of past picture into DPB can be indicated by: it can happen any time after the decoding of current picture, but has to be before decoding of the next current picture (can be after parsing the slice header of the first slice of the next current picture). One example of the replace time is immediately after decoding of the current picture, at the CPB removal time of the last decoding unit of access unit n (containing the current picture).

The DPB fullness remains unchanged.

In a variation to the third embodiment, before decoding the current picture (but after parsing the slice header of the first slice of the current picture), the filtered version and unfiltered version of current picture are the same if it is known that the in-loop filters (e.g., deblocking and SAO filters) are disabled for the entire picture. The operations related to the unfiltered version of current picture such as, putting it into DPB and incrementing DPB fullness by one, and removing it from DPB and decrementing DPB fullness by one, is not necessary. In this case, the operations for the filtered version of current picture, can be the same as specified in the third embodiment, or the operations for the filtered version of current picture is not necessary since it is the same as the unfiltered version in this case.

In the three embodiments mentioned above, the flag curr_pic_as_ref_enabled_flag can be a sequence level, picture level or slice level flag, indicating that for a whole sequence/picture/slice, the current picture may be used as reference picture.

The identification of the situation that no in-loop filters are used for the entire picture (deblocking and SAO are disabled for the picture) can be represented in the following conditions:

The SAO filter is not used for the current picture, if one of the three cases is true:

Case 1: when sequence level SAO enable flag sample_adaptive_offset_enabled_flag is false.

Case 2: when sequence level SAO enable flag sample_adaptive_offset_enabled_flag is true, there is only once slice in the picture, and the slice header flag(s) slice_sao_luma_flag and slice_sao_chroma_flag (if chroma components exist) is(are) false.

Case 3: when sequence level SAO enable flag sample_adaptive_offset_enabled_flag is true, there are more than once slice in the picture, and the slice header flag(s) slice_sao_luma_flag and slice_sao_chroma_flag (if chroma components exist) for all slices are false.

The deblocking filter is not used for the current picture, if one of the three cases is true:

Case 1: There is only one slice in the picture, and the slice header flag slice_deblocking_filter_disabled_flag is present and is true.

Case 2: There is only one slice in the picture, the slice header flag slice_deblocking_filter_disabled_flag is not present, and the picture level pps_deblocking_filter_disabled_flag is true.

Case 3: There is more than one slice in the picture, all the slice header flag slice_deblocking_filter_disabled_flag are true when present; or when not present, the picture level pps_deblocking_filter_disabled_flag is true.

DPB Size Management when IntraBC is Enabled

In the first embodiment, when both filtered and unfiltered versions of current picture are placed into the DPB before the decoding of current picture, the DPB size (maxDpbPicBuf) is kept unchanged.

In the second embodiment, the filtered version of current picture is placed into the DPB before the decoding of current picture while the other hand, the unfiltered picture is not placed into DPB. Alternatively, the unfiltered version of current picture can be placed into the DPB before the decoding of current picture while the filtered picture is not put into DPB. In both cases, the maxDpbPicBuf is modified as maxDpbPicBuf—curr_pic_as_ref_enabled_flag. If curr_pic_as_ref_enabled_flag is equal to 1, one buffer is reserved for the one version that is not in DPB.

In a variation to the second embodiment, during calculating the DPB size using maxDpbPicBuf—curr_pic_as_ref_enabled_flag, the curr_pic_as_ref_enabled_flag part is also conditioned by the identification of the use of in-loop filters in the current picture. The process can be represented by the following statements:

if no filter is used for current picture, DPB size is maxDpbPicBuf;
otherwise, if curr_pic_as_ref_enabled_flag is true, DPB size is maxDpbPicBuf−1
otherwise, DPB size is maxDpbPicBuf The flag curr_pic_as_ref_enabled_flag can be incorporated in a sequence level, picture level or slice level flag indicating that the current picture may be used as reference picture for a whole corresponding sequence/picture/slice.

In the third embodiment, the filtered version of current picture is placed into the DPB before the decoding of current picture while the unfiltered picture is not put into DPB. Alternatively, the unfiltered version of current picture can be placed into the DPB before the decoding of current picture while the filtered picture is not put into DPB. In both cases the maxDpbPicBuf is modified as maxDpbPicBuf−1. One buffer is reserved for the one version that is not in DPB.

FIG. 1 illustrates a flowchart of an exemplary coding system using coding modes including IntraBC mode (Intra-block copy mode) and Inter prediction mode according to an embodiment of the present invention. The system determines a current-picture-usage flag in a picture level or slice level in step 110, where the current-picture-usage flag indicates whether IntraBC mode is enabled for a current picture and the current picture is allowed to be used as a reference picture for the current picture. Whether the current-picture-usage flag indicates that the IntraBC mode is not enabled for the current picture and the current picture is not allowed to be used as the reference picture for the current picture is checked in step 120. If the result is "Yes", steps 130 and 140 are performed. If the result is "No", steps 150 and 160 are performed. In step 130, only one picture buffer in a DPB (decoded picture buffer) is allocated for the current picture. In step 140, a reconstructed current picture after in-loop filtering or the reconstructed current picture before the in-loop filtering is stored in said one picture buffer in the DPB. In step 150, up to two picture buffers in the DPB are allowed to be allocated for the current picture. In step 160, the reconstructed current picture after the in-loop filtering and the reconstructed current picture before the in-loop filtering are allowed to be stored in said up to two picture buffers in the DPB.

Figure 2:
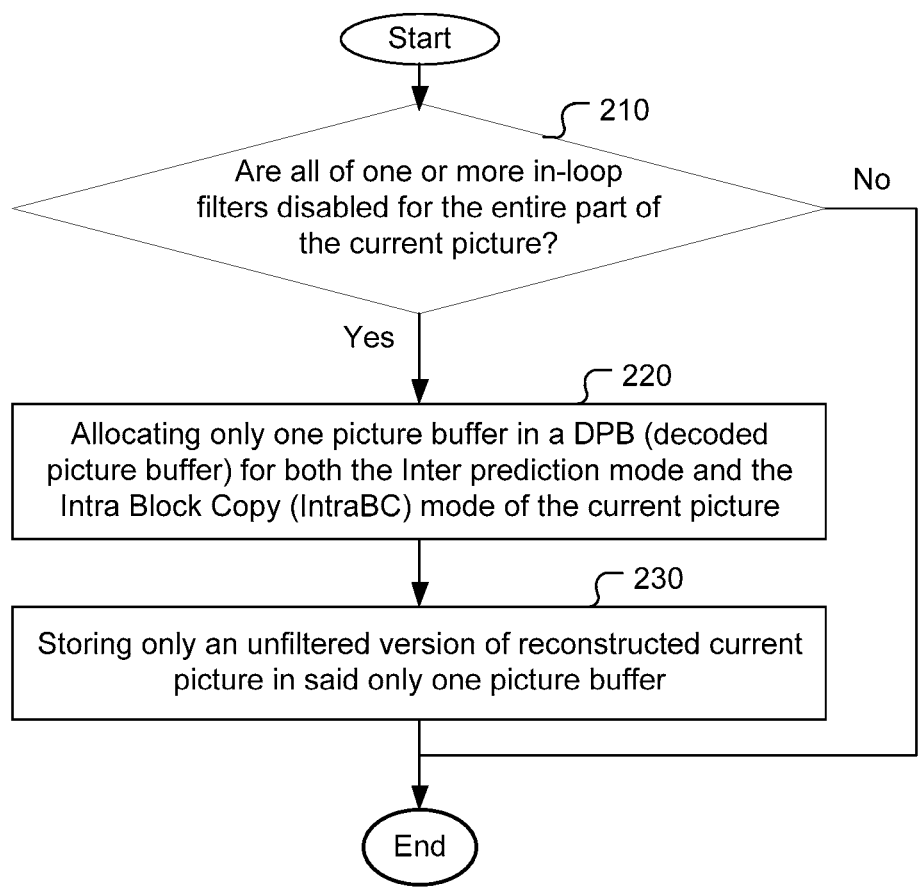
FIG. 2 illustrates a flowchart of an exemplary coding system using coding modes including conventional (or temporal) Inter prediction mode (as in HEVC version 1 and AVC) and a new inter prediction mode adopted by HEVC SCC, a.k.a. Intra Block Copy (IntraBC) mode according to an embodiment of the present invention, where if deblocking filter and SAO filter (sample adaptive offset filter) are disabled for entire current picture, only one picture buffer is allocated to store an unfiltered version of reconstructed current picture.

FIG. 2 illustrates a flowchart of an exemplary coding system using coding modes including IntraBC mode (Intra-block copy mode) and Inter prediction mode according to another embodiment of the present invention. The system determines whether all of one or more in-loop filters are disabled for an entire part of a current picture in step 210, wherein said one or more in-loop filters can be deblocking filter and SAO filter (sample adaptive offset filter). If the result is "Yes", steps 220 and 230 are performed. If the result is "No", steps 220 and 230 are bypassed. In step 220, only one picture buffer in a DPB (decoded picture buffer) is allocated for both the Inter prediction mode and the Intra Block Copy (IntraBC) mode of the current picture. In step 230, only an unfiltered version of reconstructed current picture is stored in said only one picture buffer.

The flowcharts shown above are intended to illustrate examples of buffer management for coding system using coding modes including IntraBC mode (Intra-block copy mode) and Inter prediction mode according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of managing a DPB (decoded picture buffer) for a video coding system, wherein the video coding system uses coding modes including an Inter prediction mode and an Intra Block Copy (IntraBC) mode, comprising:
   determining a current-picture-usage flag in a picture level or slice level, wherein the current-picture-usage flag indicates whether the IntraBC mode is enabled for a current picture and the current picture is allowed to be used as a reference picture for the current picture;
   if the current-picture-usage flag indicates that the IntraBC mode is not enabled and the current picture is not allowed to be used as the reference picture for the current picture:
      allocating only one picture buffer in the DPB (decoded picture buffer) for the current picture; and
      storing a reconstructed current picture after in-loop filtering or the reconstructed current picture before the in-loop filtering in said one picture buffer in the DPB; and
   if the current-picture-usage flag indicates that the IntraBC mode is enabled for the current picture and the current picture is allowed to be used as the reference picture for the current picture:
      allowing to allocate up to two picture buffers in the DPB for the current picture; and
      allowing to store both the reconstructed current picture after the in-loop filtering and the reconstructed current picture before the in-loop filtering in said up to two picture buffers in the DPB.

2. The method of claim 1, wherein the current-picture-usage flag in the picture level or slice level is used to replace a corresponding current-picture-usage flag in a sequence level.

3. The method of claim 1, wherein the current-picture-usage flag in the picture level is used in addition to a corresponding current-picture-usage flag in a sequence level.

4. The method of claim 1, wherein the current-picture-usage flag in the slice level is used in addition to a corresponding current-picture-usage flag in a sequence level.

5. A method of managing a DPB (decoded picture buffer) for a video coding system, wherein the video coding system uses coding modes including an Inter prediction mode and an Intra Block Copy (IntraBC) mode, comprising:
   determining whether one or more in-loop filters are used for an entire part of a current picture; and
      if all of said one or more in-loop filters are disabled for the entire part of the current picture:
         allocating only one picture buffer in the DPB (decoded picture buffer) for both the Inter prediction mode and the Intra Block Copy (IntraBC) mode of the current picture; and
         storing only an unfiltered version of a reconstructed current picture in said one picture buffer.

6. The method of claim 5, further comprising:
   determining a current-picture-usage flag in a sequence level, picture level or slice level, wherein the current-picture-usage flag indicates whether the IntraBC mode is enabled for the current picture and the current picture is allowed to be used as a reference picture for the current picture; and
   if the current-picture-usage flag indicates that the IntraBC mode is not enabled and the current picture is not allowed to be used as the reference picture for the current picture, allocating only one picture buffer in the DPB for the Inter prediction mode of the current picture and storing only a filtered version of the reconstructed current picture in said one picture buffer.

7. The method of claim 5, wherein said one or more in-loop filters comprise deblocking filter and SAO filter (sample adaptive offset filter).

8. The method of claim 7, wherein the SAO filter is disabled if any of following conditions is true:
   a) a sequence level SAO enable flag is false;
   b) the sequence level SAO enable flag is true, there is only one slice in the current picture, and a slice level SAO flag is false for all colour components; and
   c) the sequence level SAO enable flag is true, there are more than one slice in the current picture, and the slice level SAO flag is false for all colour components and for all slices.

9. The method of claim 7, wherein the deblocking filter is disabled if any of following conditions is true:
   a) there is only one slice in the current picture, and a slice-level deblocking-filter-disable flag is present and is true;
   b) there is only one slice in the current picture, the slice-level deblocking-filter-disable flag is not present, and a picture-level deblocking-filter-disable flag is true; and
   c) there are more than one slice in the current picture, the slice-level deblocking-filter-disable flag is true for all slices when present or when not present, the picture-level deblocking-filter-disable flag is true.

10. An apparatus for managing a DPB (decoded picture buffer) for a video coding system, wherein the video coding system uses coding modes including an Inter prediction mode and an Intra Block Copy (IntraBC) mode, comprising one or more electronic circuits arranged to:
   determine a current-picture-usage flag in a picture level or slice level, wherein the current-picture-usage flag indicates whether the IntraBC mode is enabled for a current picture and the current picture is allowed to be used as a reference picture for the current picture;
   if the current-picture-usage flag indicates that the IntraBC mode is not enabled and the current picture is not allowed to be used as the reference picture for the current picture:
      allocate only one picture buffer in the DPB (decoded picture buffer) for the current picture; and
      store a reconstructed current picture after in-loop filtering or the reconstructed current picture before the in-loop filtering in said one picture buffer in the DPB; and
   if the current-picture-usage flag indicates that the IntraBC mode is enabled for the current picture and the current picture is allowed to be used as the reference picture for the current picture:
      allow to allocate up to two picture buffers in the DPB for the current picture; and
      allow to store the reconstructed current picture after the in-loop filtering and the reconstructed current picture before the in-loop filtering in said up to two picture buffers in the DPB.

11. An apparatus for managing a DPB (decoded picture buffer) for a video coding system, wherein the video coding system uses coding modes including an Inter prediction mode and an Intra Block Copy (IntraBC) mode, comprising one or more electronic circuits arranged to:

determine whether one or more in-loop filters are used for an entire part of a current picture; and
      if all of said one or more in-loop filters are disabled for the entire part of the current picture:
    allocate only one picture buffer in the DPB (decoded picture buffer) for both the Inter prediction mode and the Intra Block Copy (IntraBC) mode of the current picture; and
    store only an unfiltered version of a reconstructed current picture in said one picture buffer.

* * * * *